US00RE50645E

(19) United States
(12) Reissued Patent
Matsumura et al.

(10) Patent Number: US RE50,645 E
(45) Date of Reissued Patent: *Oct. 21, 2025

(54) INK JET RECORDING APPARATUS

(71) Applicant: CANON KABUSHIKI KAISHA, Tokyo (JP)

(72) Inventors: Hideaki Matsumura, Tokyo (JP); Koki Shimada, Kanagawa (JP); Yusuke Tanaka, Kanagawa (JP); Takahiro Kiuchi, Tokyo (JP); Masaya Shimmachi, Kanagawa (JP); Yukimichi Kimura, Kanagawa (JP); Junichi Kubokawa, Nagasaki (JP); Kyohei Sato, Kanagawa (JP)

(73) Assignee: Canon Kabushiki Kaisha, Tokyo (JP)

( * ) Notice: This patent is subject to a terminal disclaimer.

(21) Appl. No.: 17/725,082

(22) Filed: Apr. 20, 2022

Related U.S. Patent Documents

Reissue of:
(64) Patent No.: 10,625,514
Issued: Apr. 21, 2020
Appl. No.: 16/155,611
Filed: Oct. 9, 2018

U.S. Applications:
(63) Continuation of application No. 15/335,277, filed on Oct. 26, 2016, now Pat. No. 10,131,154.

(30) Foreign Application Priority Data

Oct. 30, 2015 (JP) ..... 2015-214967

(51) Int. Cl.
*B41J 2/175* (2006.01)
*B41J 29/02* (2006.01)
(Continued)

(52) U.S. Cl.
CPC ..... *B41J 2/17596* (2013.01); *B41J 2/175* (2013.01); *B41J 2/17509* (2013.01);
(Continued)

(58) Field of Classification Search
CPC .... B41J 2/17596; B41J 29/02; B41J 2/17509; B41J 2/1752; B41J 29/38; B41J 2/175; B41J 29/13
See application file for complete search history.

(56) References Cited

U.S. PATENT DOCUMENTS 10,131,154 B2 * 11/2018 Matsumura ..... B41J 29/13
2007/0229620 A1 10/2007 Yano
(Continued)

FOREIGN PATENT DOCUMENTS

CN 104520110 A 4/2015
EP 0712727 A2 * 5/1996 ..... B41J 2/1752
(Continued)

*Primary Examiner* — Elizabeth L McKane
(74) *Attorney, Agent, or Firm* — Canon U.S.A., Inc. IP Division

(57) ABSTRACT

There is provided an ink jet recording apparatus capable of preventing a user from erroneously performing an opening and closing operation of a valve in the supply of ink to a recording head from an ink tank. The ink jet recording apparatus includes a recording head configured to eject ink, an ink tank provided in an apparatus body, including an filling portion for filling ink to be supplied to the recording head, and configured to store the filled ink, a cover member configured to be movable to a position where the filling portion is not exposed and a second position where the filling portion is exposed, and a valve configured to be switchable between an opened state where ink can be supplied to the recording head from the ink tank and a closed state where the supply of ink to the recording head from the ink tank is blocked, wherein the valve operates interlocking with the movement of the cover member, and is in the opened state when the cover member is at the first position and in the closed state when the cover member is at the second position.

48 Claims, 15 Drawing Sheets

(51) Int. Cl.
*B41J 29/13* (2006.01)
*B41J 29/38* (2006.01)

(52) U.S. Cl.
CPC ..... *B41J 2/1752* (2013.01); *B41J 29/02* (2013.01); *B41J 29/13* (2013.01); *B41J 29/38* (2013.01)

(56) References Cited

U.S. PATENT DOCUMENTS

| | | | | |
|---|---|---|---|---|
| 2010/0026753 | A1 | 2/2010 | Kuroda | |
| 2014/0085386 | A1* | 3/2014 | Wei | B41J 2/17596 347/85 |

FOREIGN PATENT DOCUMENTS

| | | | |
|---|---|---|---|
| JP | 2007-021971 | A | 2/2007 |
| JP | 2007-144643 | A | 6/2007 |
| JP | 2014-100842 | A | 6/2014 |

* cited by examiner

INK JET RECORDING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a Continuation of U.S. patent application Ser. No. 15/335,277, filed Oct. 26, 2016, which claims the benefit of Japanese Patent Application No. 2015-214967, filed Oct. 30, 2015, each of which is hereby incorporated by reference herein in their entirety.

BACKGROUND OF THE INVENTION

Field of the Invention

The present invention relates to an ink jet recording apparatus.

Description of the Related Art

Japanese Patent Application Laid-Open No. 2014-79910 discusses a recording apparatus including an ink tank having a filling port for replenishing ink, a recording head that ejects ink supplied from the ink tank, and a valve capable of opening and closing a flow path between the recording head and the ink tank. According to the apparatus, the valve is provided on a discharge port side of a recording medium and on the side of the ink tank so that a user can easily recognize the existence of the valve and the operability of the valve can be improved.

However, the apparatus discussed in Japanese Patent Application Laid-Open No. 2014-79910, the user needs to manually perform an opening and closing operation of the valve. If the user has erroneously performed the opening and closing operation to perform recording with the valve closed, no ink is supplied to the recording head from the ink tank so that an ejection failure occurs. If ink is filled in the ink tank with the valve opened, for example, the recording head becomes pressurized due to a change in a liquid surface of ink. As a result, ink leaks out of an ink filling port in the recording head.

SUMMARY OF THE INVENTION

The present invention relates to an ink jet recording apparatus capable of inhibiting a user from erroneously performing an opening and closing operation of a valve in supplying ink from an ink tank to a recording head.

According to an aspect of the present invention, an ink jet recording apparatus includes a recording head configured to eject ink and record an image, an ink tank provided in an apparatus body, including an filling portion for injecting ink supplied to the recording head, and configured to store the injected ink, a first cover member configured to be movable to a first position where the filling portion is not exposed and a second position where the filling portion is to be exposed, and a valve configured to be switchable between an opened state where ink can be supplied to the recording head from the ink tank and a closed state where the supply of ink from the ink tank to the recording head is blocked, in which the valve operates interlocking with the movement of the first cover member, and is in the opened state when the first cover member is at the first position and in the closed state when the first cover member is at the second position.

Further features of the present invention will become apparent from the following description of exemplary embodiments with reference to the attached drawings.

DESCRIPTION OF THE EMBODIMENTS

A first exemplary embodiment of the present invention will be described in detail below with reference to the drawings.

Figure 1:
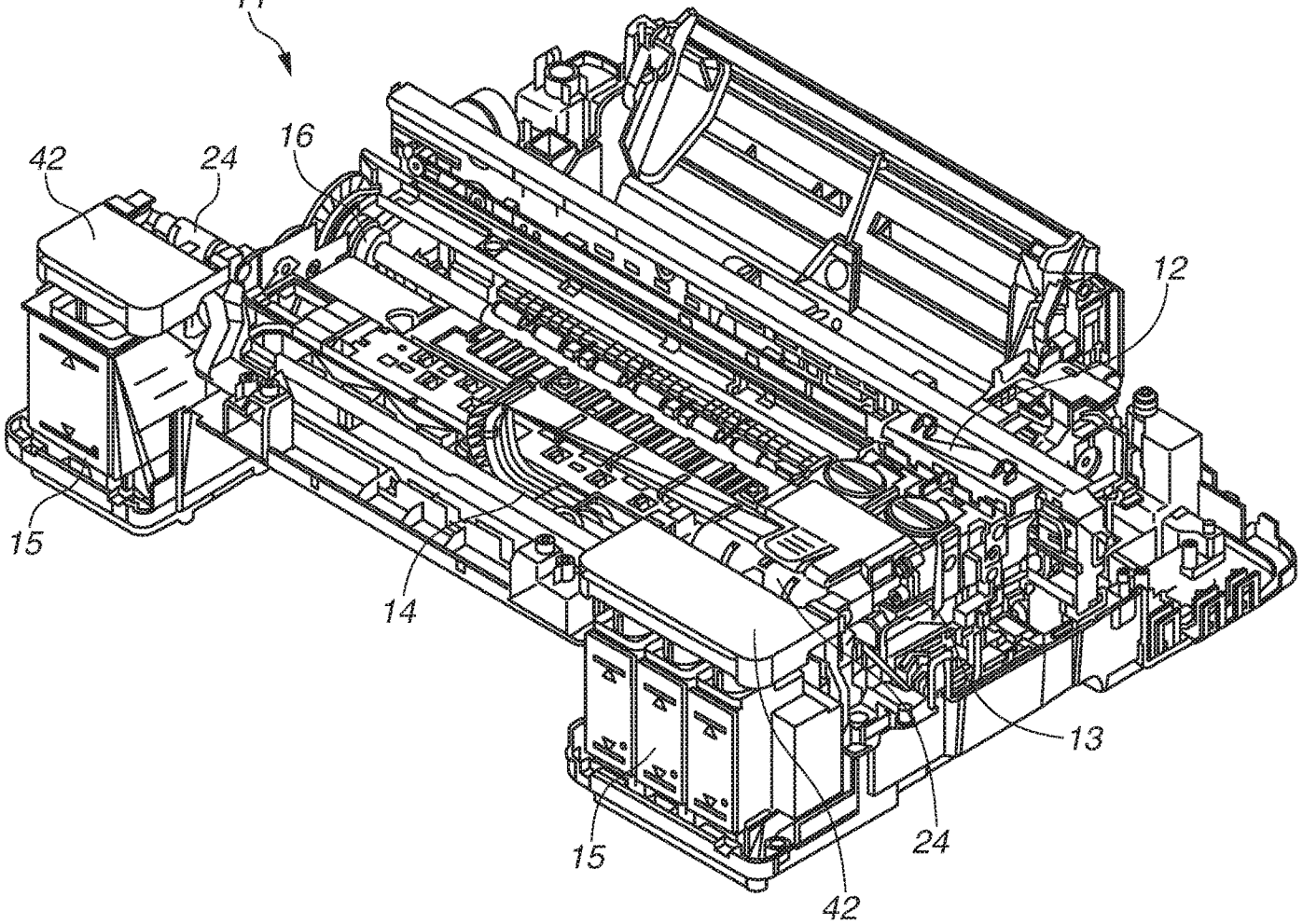
FIG. 1 a schematic diagram illustrating an ink jet recording apparatus according to a first exemplary embodiment.

FIG. 1 is a schematic diagram illustrating an ink jet recording apparatus 11 according to a first exemplary embodiment of the present invention. The ink jet recording apparatus 11 includes a recording head 13 held in a carriage 12 and ejects ink, an ink supply path 14 for supplying ink to the recording head 13, and an ink tank 15 storing ink. The ink jet recording apparatus 11 includes a feeding roller (not illustrated) for feeding a sheet (recording medium), a conveyance roller 16 for conveying the recording medium, and a discharge roller (not illustrated) for discharging the recording medium. The ink jet recording apparatus 11 includes an ink suction mechanism 52 for suctioning ink from an ink ejection port 31 (FIG. 3) in the recording head 13 using a tube and a pump while a suction cap is made to abut on the recording head 13 to recover an ejection performance of the recording head 13.

Figure 2:
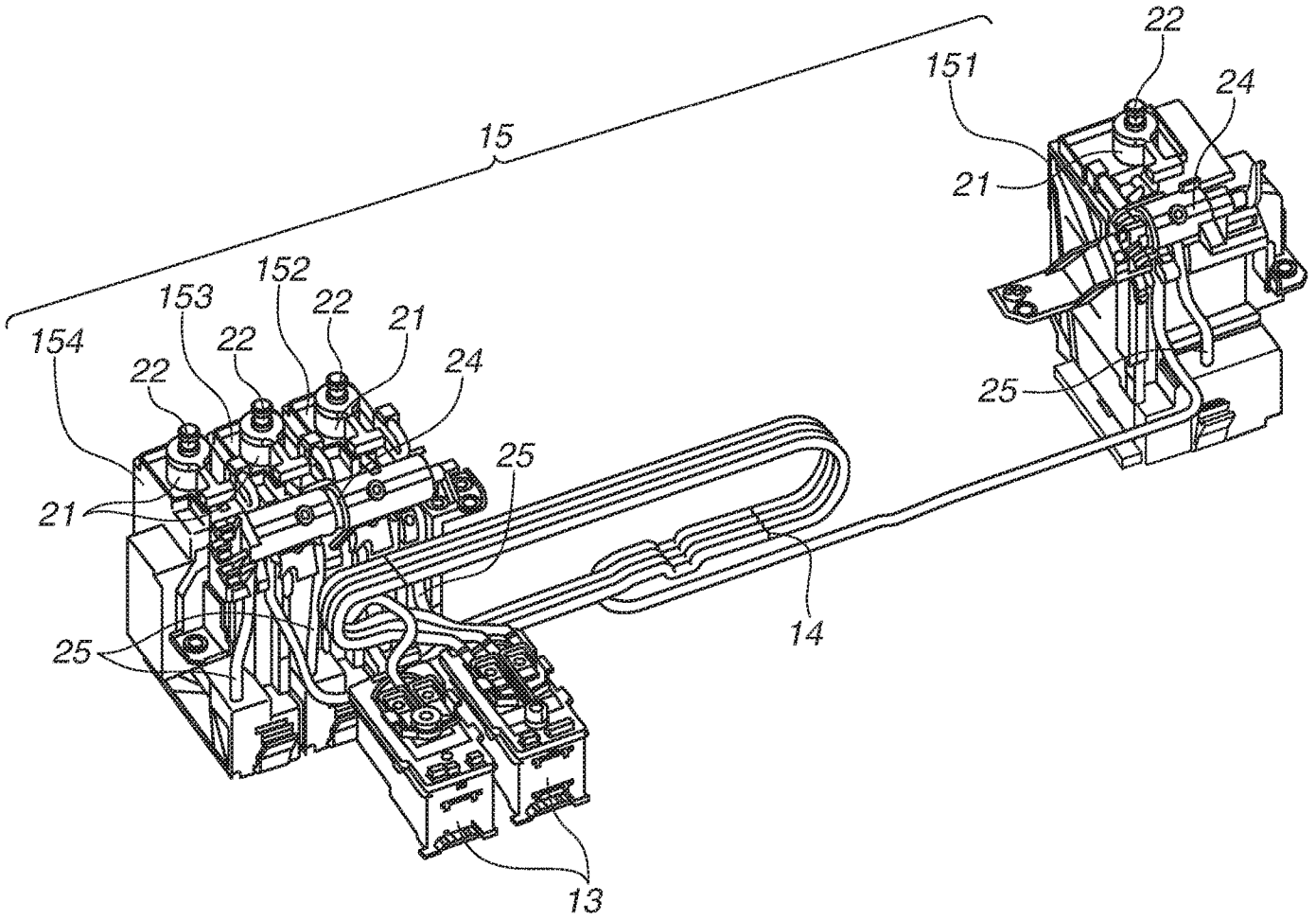
FIG. 2 is a schematic diagram illustrating an ink supply system according to the first exemplary embodiment.

FIG. 2 is a schematic diagram illustrating an ink supply system of the ink jet recording apparatus 11 according to the present exemplary embodiment. The ink tank 15 is provided for each corresponding ink color. In the present exemplary embodiment, the ink tank 15 includes four ink tanks, i.e., a black ink tank 151, a cyan ink tank 152, a magenta ink tank 153, and a yellow ink tank 154. A tube constituting the ink supply path 14 for supplying ink to the recording head 13 is attached to the ink tank 15. A tube constituting an air communication path 25 for communicating the inside of the ink tank 15 with an atmosphere is attached to the ink tank 15. An ink filling port (ink filling portion) 21 for filling ink is provided on the top of the ink tank 15. A tank cap 22 for sealing the ink filling port 21 is attached to the ink filling port 21. A user can fill ink into the ink tank 15 from the ink filling port 21 by removing the tank cap 22. A valve unit 24, which blocks communication of ink, is provided between the ink tank 15 and the recording head 13 in the ink supply path 14. Similarly, a valve unit 24, which blocks communication of air, is provided between the ink tank 15 and an air communication port 23 (FIG. 3) in the air communication path 25. The valve unit 24 includes a black-side valve unit and a color-side valve unit. The black-side valve unit blocks each of the ink supply path 14 and the air communication path 25 that are connected to the black ink tank 151. The color-side valve unit blocks each of the ink supply path 14 and the air communication path 25 that are connected to each of the cyan ink tank 152, the magenta ink tank 153, and the yellow ink tank 154.

Figure 3:
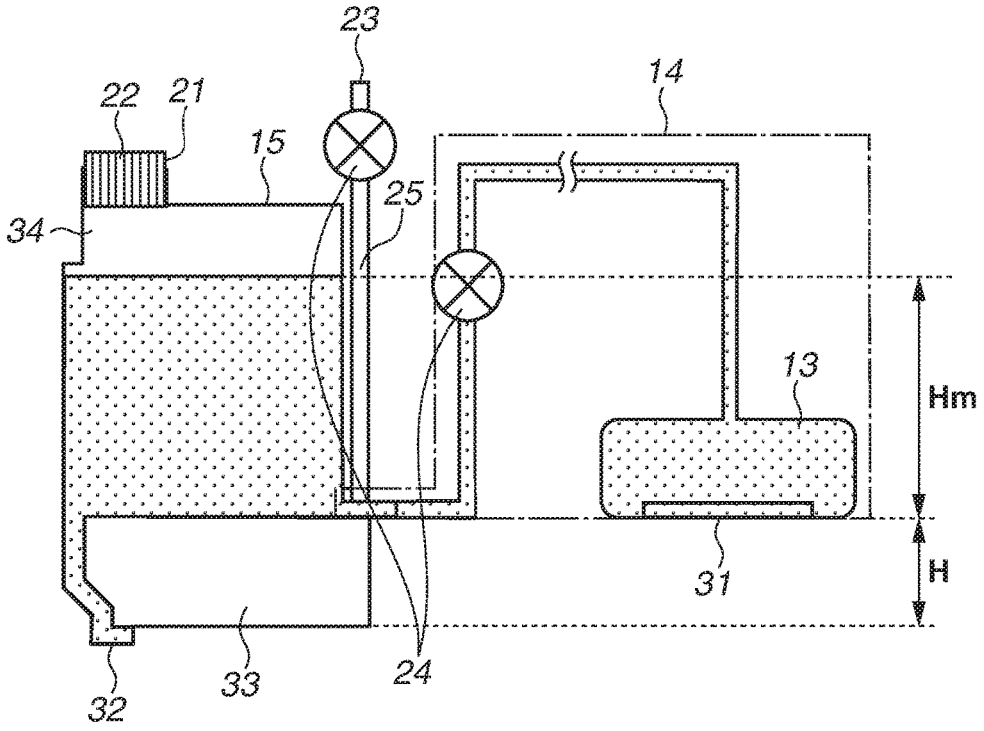
FIG. 3 is a schematic diagram illustrating a positional relationship between an ink tank and a recording head according to the first exemplary embodiment.

FIG. 3 is a schematic diagram illustrating a positional relationship between the ink tank 15 and the recording head 13. In the ink jet recording apparatus 11, a gas-liquid exchange portion 32 in the ink tank 15 is provided at a position lower by a height H in a height direction than the ink ejection port 31 in the recording head 13 to prevent ink from leaking out of the ink ejection port 31 in the recording head 13. More specifically, negative pressure caused by a water head difference corresponding to the height H is applied to the ink ejection port 31. A buffer chamber (buffer space) 33 is provided at the bottom of the ink tank 15. The buffer chamber 33 can store ink extruded from an ink storage portion 34 when air in the ink storage portion 34 has expanded due to an atmospheric pressure variation and a temperature change. With this configuration, the ink extruded from the ink storage portion 34 can be prevented from leaking out of the ink tank 15 via the air communication path 25.

A configuration of the ink supply system according to the present exemplary embodiment and the flow from filling of ink until a printing operation (recording operation) is enabled will be described below with reference to FIGS. 4A, 4B, and 4C to FIG. 6.

Figure 4A:
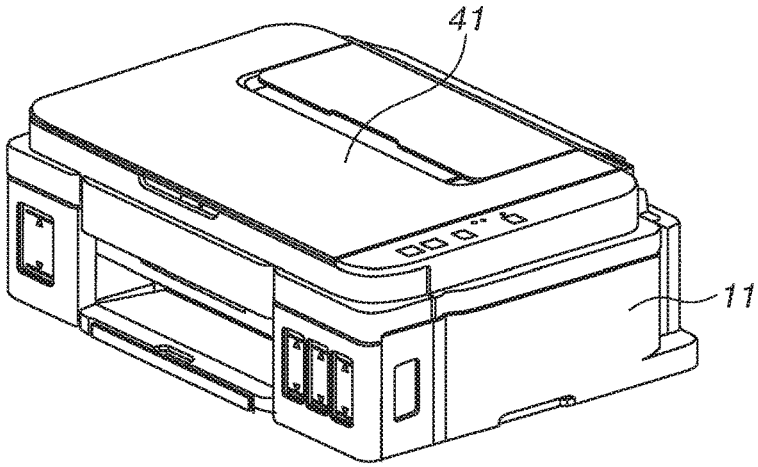
FIGS. 4A, 4B, and 4C are respectively perspective views of the ink jet recording apparatus according to the first exemplary embodiment.
Figure 4B:
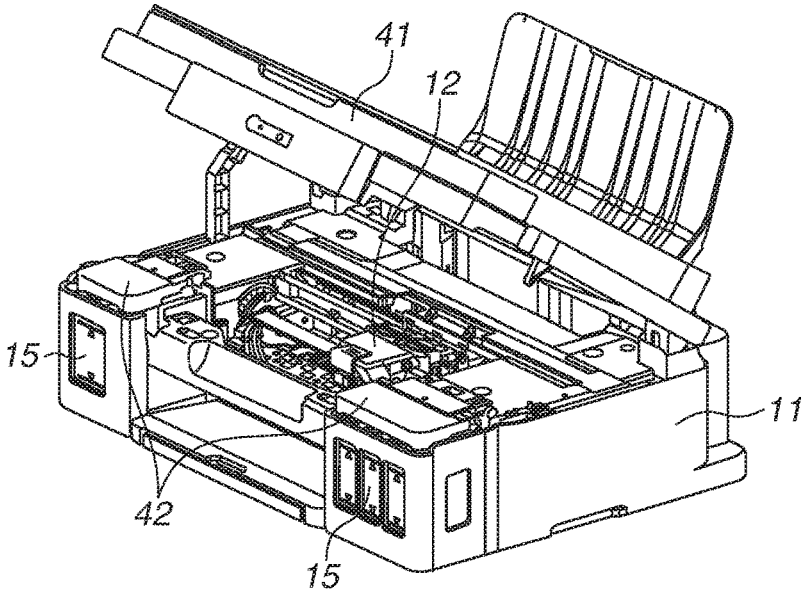
Figure 4C:
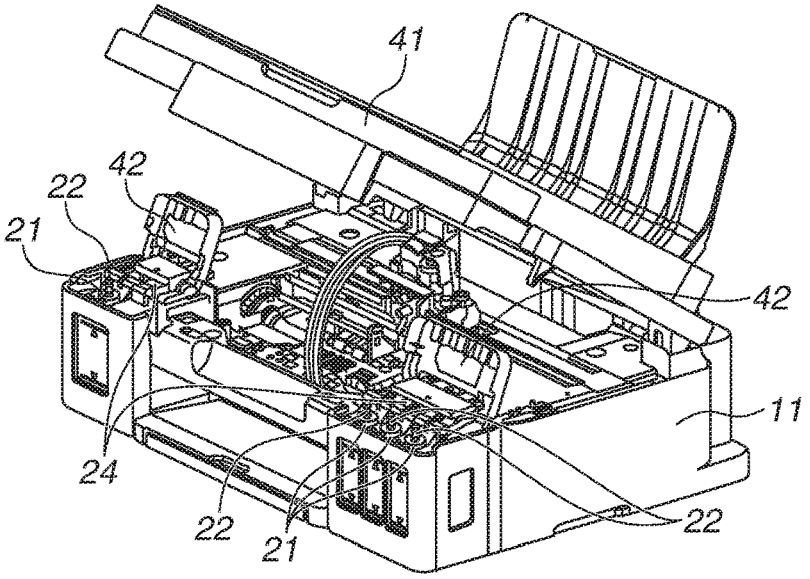
Figure 5A:
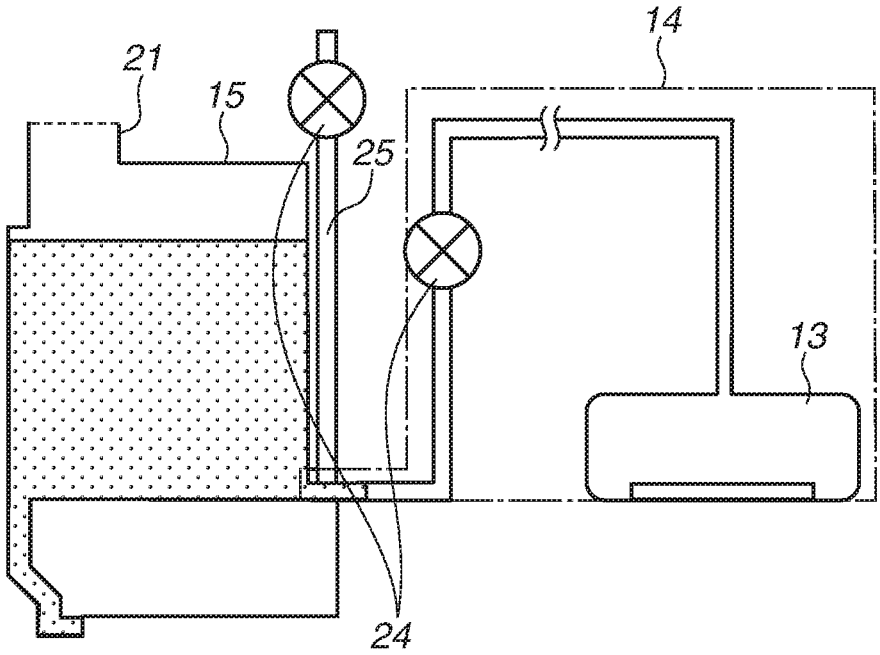
FIGS. 5A and 5B are respectively schematic diagrams illustrating a state of an ink tank and a recording head in the first exemplary embodiment.

FIGS. 4A, 4B, and 4C are perspective views of the ink jet recording apparatus 11 according to the present exemplary embodiment. As illustrated in FIG. 4A, the ink jet recording apparatus 11 includes a scanner unit (reading unit) 41 capable of reading an image on a stocked document. When the user fills ink, the scanner unit 41 is opened, to bring the ink jet recording apparatus 11 into a state illustrated in FIG. 4B. Tank covers (first cover members) 42, each of which covers the ink filling port and ports 21, are provided under the scanner unit 41. The tank cover 42 is pivotably supported on the apparatus body, and is movable to a position (first position) where the ink filling port 21 is not exposed and a position (second position) where the ink filling port 21 is exposed. When the user fills ink, the tank cover 42, which covers the ink filling port 21, is moved (opened) to the position where the ink filling port 21 is exposed. The tank cover 42 in the present exemplary embodiment is also an operation portion in the valve unit 24, details of which will be described below. Accordingly, the valve unit 24 functions interlocking with an operation performed by the user for opening the tank cover 42 so that each of the ink supply path 14 and the air communication path 25 is blocked (FIG. 5A).

The user removes the tank cap 22 attached to the ink filling port 21, and fills ink through the ink filling port 21 from an ink bottle (not illustrated). After the filling of the ink has been completed, the user attaches the tank cap 22 to the ink filling port 21 again, and moves (closes) the tank cover 42 to a position where the ink filling port 21 is not exposed. When the user closes the tank cover 42, the valve unit 24 functions interlocking with an operation for closing the tank cover 42 so that each of the ink supply path 14 and the air communication path 25 is opened. Then, the user closes the scanner unit 41.

Figure 5B:
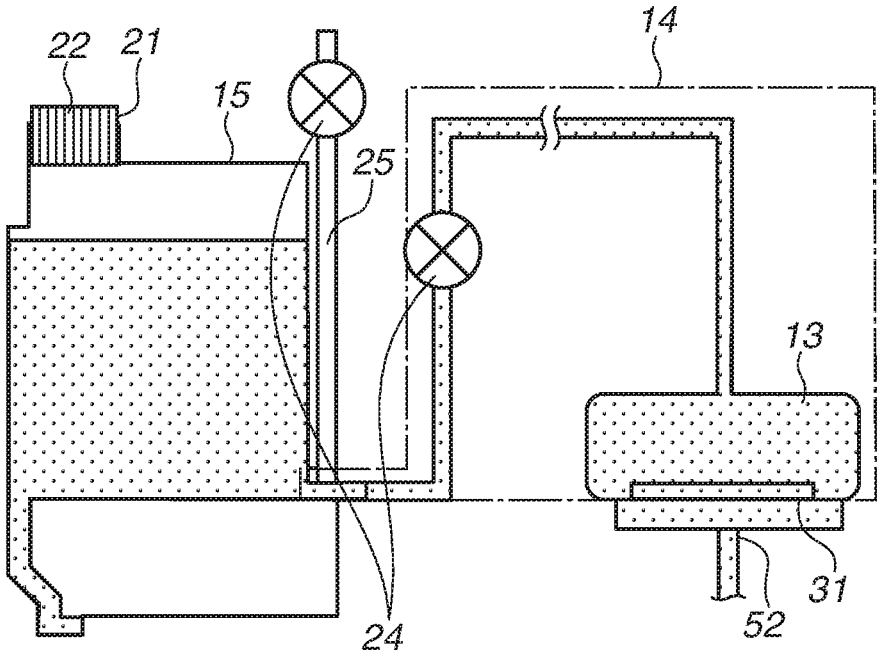

When the user closes the scanner unit 41, a suction operation for suctioning ink from the ink ejection port 31 by abutting a suction cap on the recording head 13 to fill the ink supply path 14 with ink in the ink tank 15 (FIG. 5B). With this suction operation, the tube constituting the ink supply path 14 is filled with ink. When ink is ejected from the ink ejection port 31 with the tube filled with ink, ink is supplied to the recording head 13 from the ink tank 15 by an amount of decrease in ink from inside the recording head 13 due to negative pressure caused by a water head difference. Until the amount of ink in the ink tank 15 becomes a predetermined amount or less, ink is continuously supplied to the recording head 13 from the ink tank 15 according to the ejection of ink from the ink ejection port 31.

Figure 6:
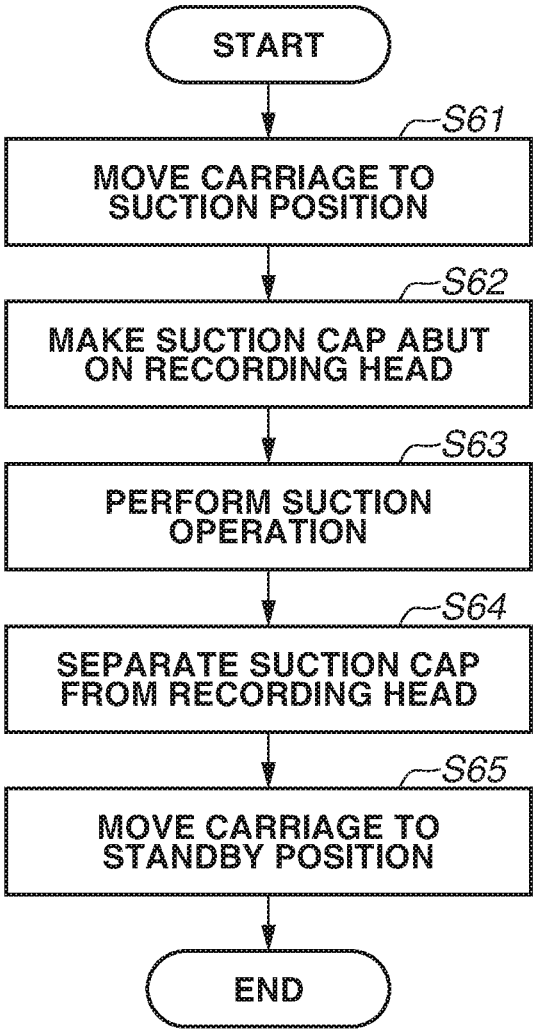
FIG. 6 is a flowchart of an ink filling sequence according to the first exemplary embodiment.

FIG. 6 is a flowchart of an ink filling sequence executed when the above-described ink suction operation is performed. When the ink filling sequence is started, first, in step S61, the carriage 12 holding the recording head 13 is moved to a suction position where the ink suction mechanism 52 is provided. In step S62, the suction cap is then made to abut on the recording head 13. In step S63, the ink suction mechanism 52 performs a suction operation for suctioning ink from the ink ejection port 31 in the recording head 13. In step S64, the suction cap and the recording head 13 are separated from each other after the suction operation has been completed. In step S65, the carriage 12 is moved from the suction position to a standby position.

Figure 7:
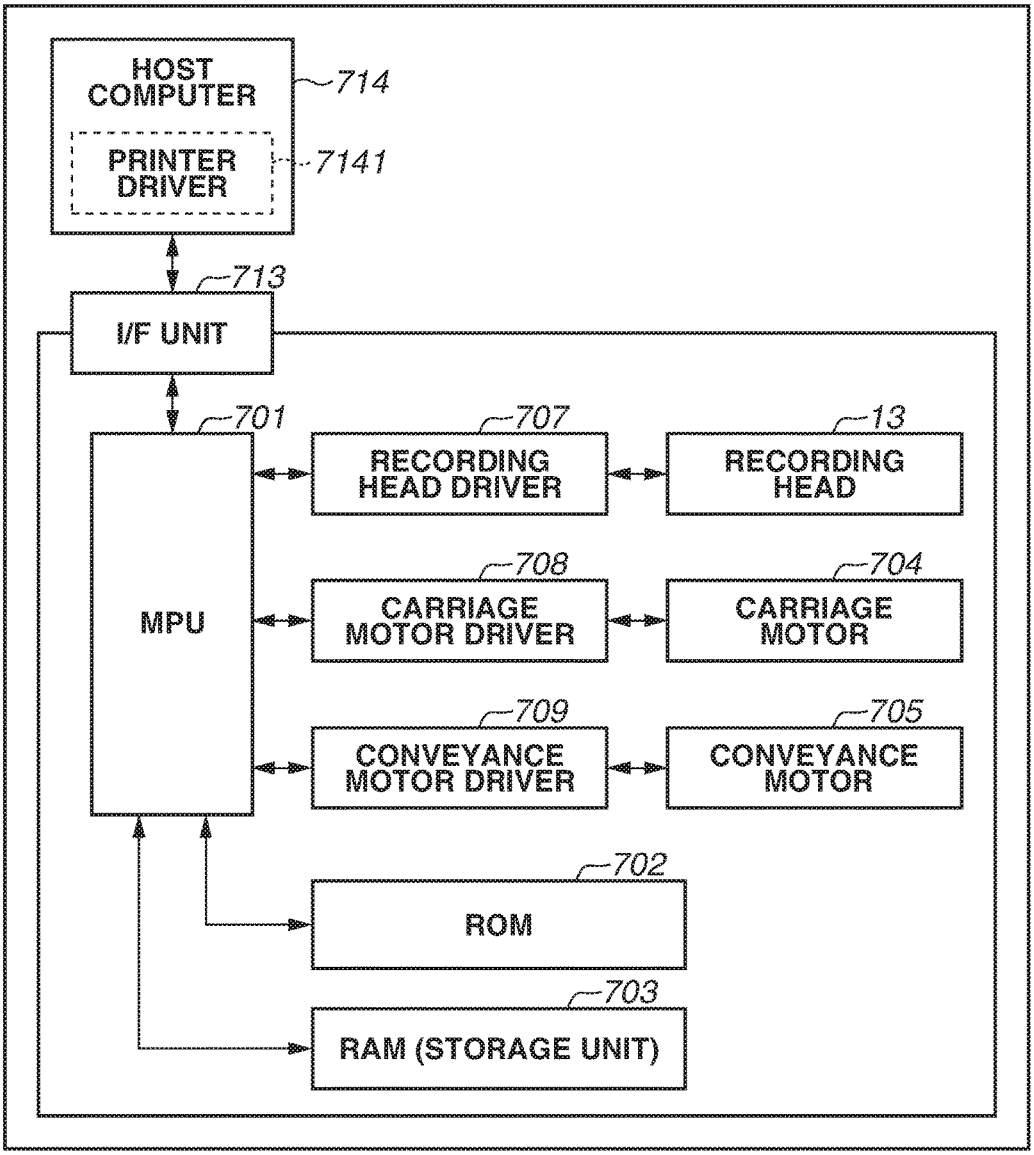
FIG. 7 is a block diagram of the ink jet recording apparatus according to the first exemplary embodiment.

FIG. 7 is a block diagram of the ink jet recording apparatus 11 according to the present exemplary embodiment. A micro processing unit (MPU) 701 controls an operation of each of the units and processing of data. A read-only memory (ROM) 702 stores a program executed by the MPU 701 and data. A random access memory (RAM) 703 temporarily stores processing data to be processed by the MPU 701 and data received from a host computer 714. A recording head driver 707 controls the recording head 13. A carriage motor 704 drives the carriage 12. A carriage motor driver 708 controls the carriage motor 704. A conveyance motor 705 drives the feeding roller, the conveyance roller 16, and the discharge roller. A conveyance motor driver 709 controls the conveyance motor 705. A host computer 714 includes a printer driver 7141 for processing recording information such as a recorded image and an image quality and communicating with the ink jet recording apparatus 11 when the user has issued an instruction to perform a recording operation. The MPU 701 exchanges the recorded image data with the host computer 714 via an interface (I/F) unit 713.

Figure 8A:
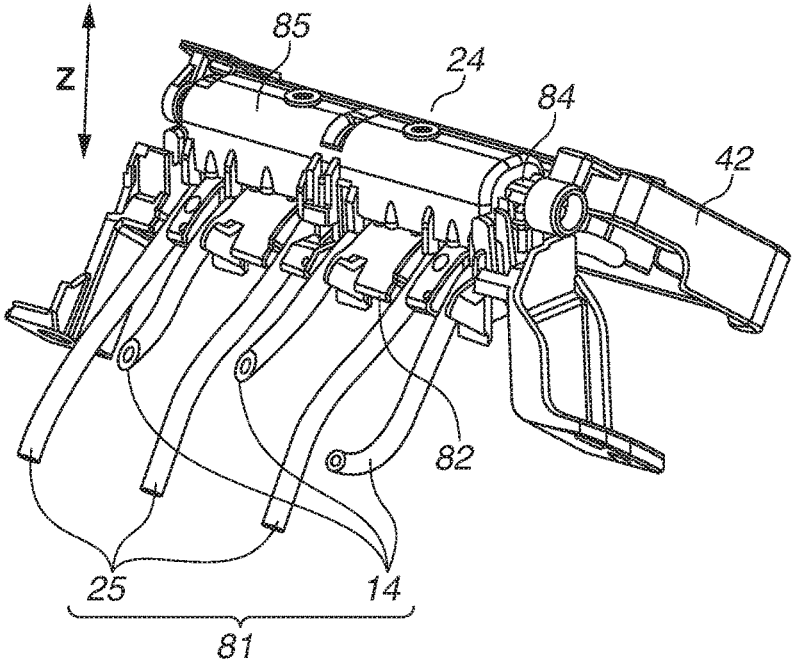
FIGS. 8A and 8B are schematic diagrams illustrating a valve unit according to the first exemplary embodiment.
Figure 8B:
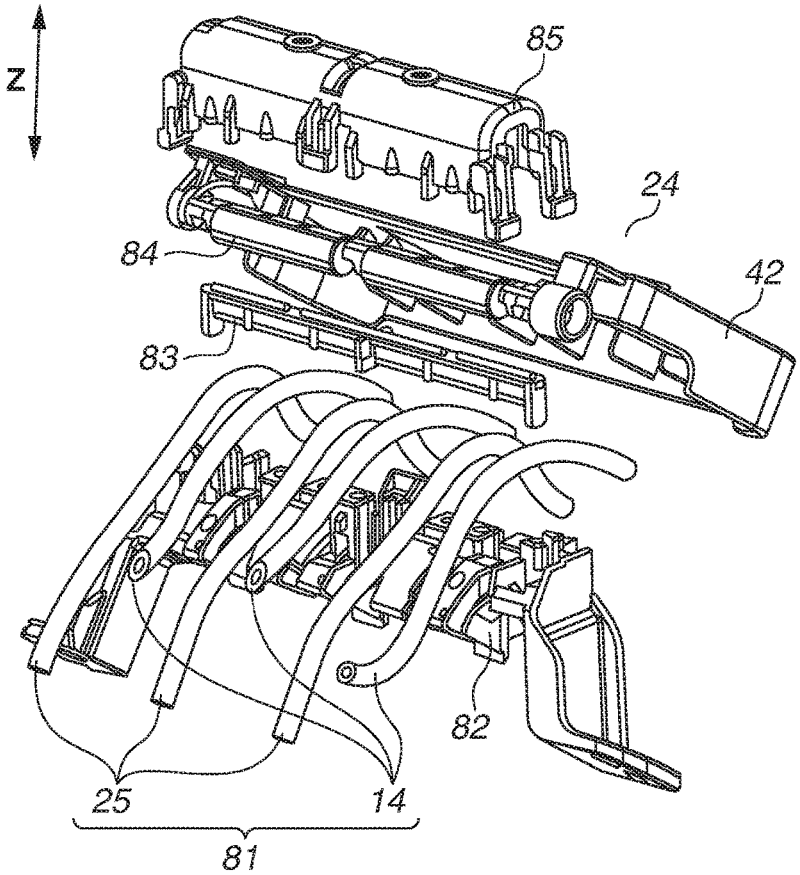

Next, a configuration of the valve unit 24 according to the present exemplary embodiment will be described. FIGS. 8A and 8B are schematic diagrams illustrating the valve unit 24 according to the present exemplary embodiment. The valve unit 24 holds a tube 81 constituting the ink supply path 14 and the air communication path 25. The valve unit 24 includes a holding member 82 for holding the tube 81, and a displacement member 83 which is moved in a Z direction in FIGS. 8A and 8B to flatten out the tube 81 and closes the tube 81. The valve unit 24 includes a cam member 84 pivotably supported and having a cam surface that is frictionally sliding with the displacement member 83, a cover member 85 supporting the cam member 84 and is fixed to the holding member 82, and a tank cover 42 latched by the cam member 84 and is operated to rotate by the user.

Figure 9A:
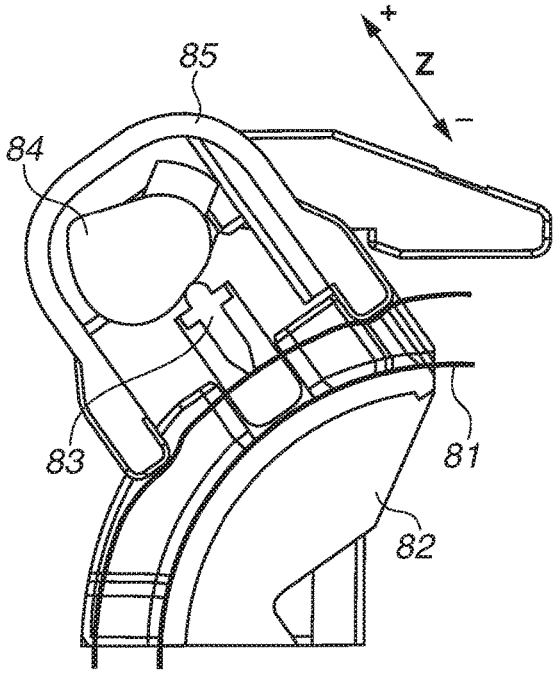
FIGS. 9A, 9B, and 9C are schematic diagrams illustrating inside of the valve unit during a closing operation of the valve unit according to the first exemplary embodiment.
Figure 9C:
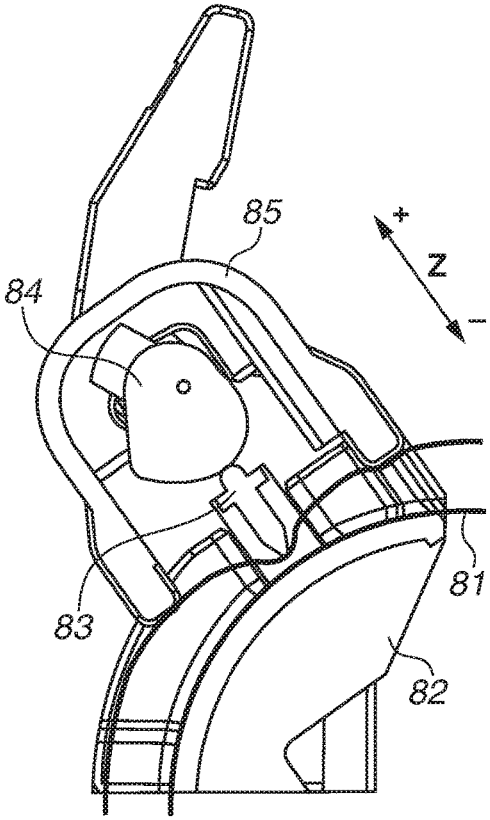
Figure 9B:
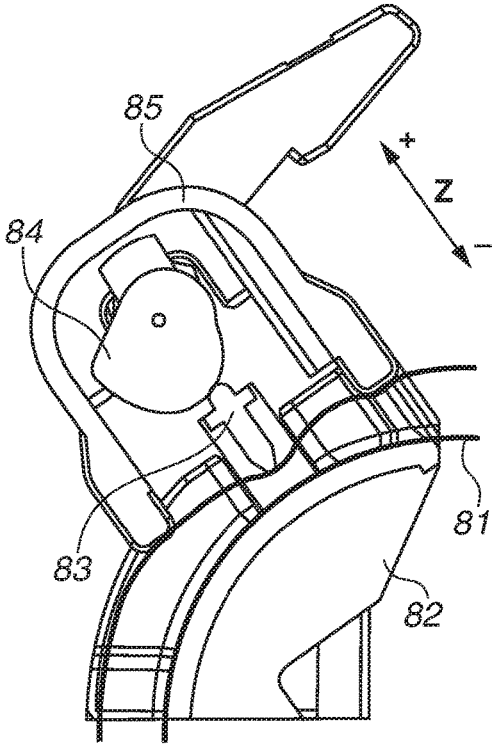

Next, an operation for the valve unit 24 according to the present exemplary embodiment to close the ink supply path 14 and the air communication path 25 will be described. FIGS. 9A, 9B, and 9C are schematic diagrams illustrating the inside of the valve unit during a closing operation of the valve unit 24 according to the present exemplary embodiment. FIG. 9A illustrates a state (an opened state) where the displacement member 83 does not flatten out the tube 81. At this time, the tank cover 42 remains closed (FIG. 4B). In this state, the ink supply path 14 is opened so that ink can be supplied to the recording head 13 from the ink tank 15. The air communication path 25 is also opened so that the inside of the ink tank 15 and external air are communicated with each other. When the tank cover 42 is opened from this state, the cam member 84 rotates in the counterclockwise direction, as illustrated in FIG. 9B. As illustrated in FIGS. 9B and 9C, when a convex portion of the cam member 84 convex with respect to a rotation center of the cam surface of the cam member 84, abuts on the displacement member 83, the displacement member 83 is displaced in a −Z direction in FIG. 9, to flatten out the tube 81. When the displacement member 83 rotates to a position illustrated in FIG. 9C, the tube is sufficiently flattened (a closed state). At this time, the tank cover 42 remains opened (FIG. 4C). In this state, the ink supply path 14 is closed so that ink cannot be supplied to the recording head 13 from the ink tank 15. The air communication path 25 is also closed so that the inside of the ink tank 15 and external air are not communicated with each other.

Next, an issue to be solved by the present invention, and the function and the effect of the present invention will be specifically described below.

First, valves respectively provided in the ink supply path 14 and the air communication path 25 need to be closed when ink is filled into the ink tank 15, as described above. When the ink supply path 14 has not been closed during ink filling, a liquid surface of ink in the ink tank 15 may become higher than the height of the ink ejection port 31 (FIG. 3). When the tank cap 22 attached to the ink filling port 21 is removed at this time, pressure caused by a water head difference corresponding to a height Hm is applied to the ink ejection port 31. Thus, ink may leak out of the ink ejection port 31, to contaminate the inside of the ink jet recording apparatus 11. On the other hand, when the air communication path 25 is not closed during ink filling, ink filled in the ink tank 15 may flow into the buffer chamber 33. In such a case, the role of the buffer chamber 33 to store ink extruded from the ink storage portion 34 when there have been an atmospheric pressure variation and a temperature change may be unable to be achieved.

To solve such an issue, the ink jet recording apparatus 11 may be configured in such a manner that the liquid surface of ink in the ink tank 15 is always at a position lower than the ink ejection port 31. However, in such a configuration, a sufficient amount of ink may be unable to be stored in the ink tank 15 when the height of the ink tank 15 is restricted, and the size of the ink jet recording apparatus 11 may increase when the ink ejection port 31 is provided at a high position. The ink jet recording apparatus 11 may also be provided with a sensor capable of detecting that the valve has been closed and provided with a mechanism for automatically opening and closing the valve when the sensor detects that the valve has not been sufficiently closed. However, such a configuration may increase costs.

In the present exemplary embodiment, while the tank cover 42 is closed as illustrated in FIG. 4B, the ink filling port 21 and the tank cap 22 attached to the ink filling port 21 have not been exposed. Accordingly, while the tank cover 42 is closed, the tank cap 22 attached to the ink filling port 21 cannot be detached from the ink filling port 21. When the tank cover 42 becomes opened as illustrated in FIG. 4C, the tank cap 22 attached to the ink filling port 21 can be detached from the ink filling port 21. More specifically, the tank cover 42 is always opened during ink filling, and the valve can be reliably closed during ink filling. Accordingly, even if the liquid surface of the ink filled in the ink tank 15 is higher than the ink ejection port 31 in the recording head 13, pressure is not applied to the inside of the recording head 13 because the ink supply path 14 is closed. When the tank cover 42 is closed after the tank cap 22 is attached on the ink filling port 21, the valve is opened, and the ink supply path 14 is opened. In this way, the negative pressure caused by the water head difference corresponding to the height H shown in FIG. 3 is applied to the recording head 13 so that printing can be normally performed.

Further, in the present exemplary embodiment, access to the recording head 13 in the ink jet recording apparatus 11 is enabled by an opening and closing operation of the scanner unit 41. More specifically, the recording head 13 cannot be accessed with the scanner unit 41 closed, and the recording head 13 can be accessed with the scanner unit 41 opened. FIG. 4A illustrates a state where the scanner unit 41 is closed. In this state, a printing operation can be performed using the recording head 13. On the other hand, FIGS. 4B and 4C illustrate a state where the scanner unit 41 is opened. In this state, a printing operation cannot be performed. When the tank cover 42 is opened with the scanner unit 41 thus opened, ink can be filled into the ink tank 15.

In the present exemplary embodiment, the ink jet recording apparatus 11 includes a sensor (not illustrated) capable of detecting the opening and closing of the scanner unit 41. If it is detected that the scanner unit 41 remains closed, a printing operation can be performed. To close the scanner unit 41, the tank cover 42 first needs to be closed. Accordingly, during the printing operation, the tank cover 42 is always closed, and the valve is opened. This can prevent a situation where no ink is supplied to the recording head 13 because the printing operation is performed with the valve unopened.

Figure 10:
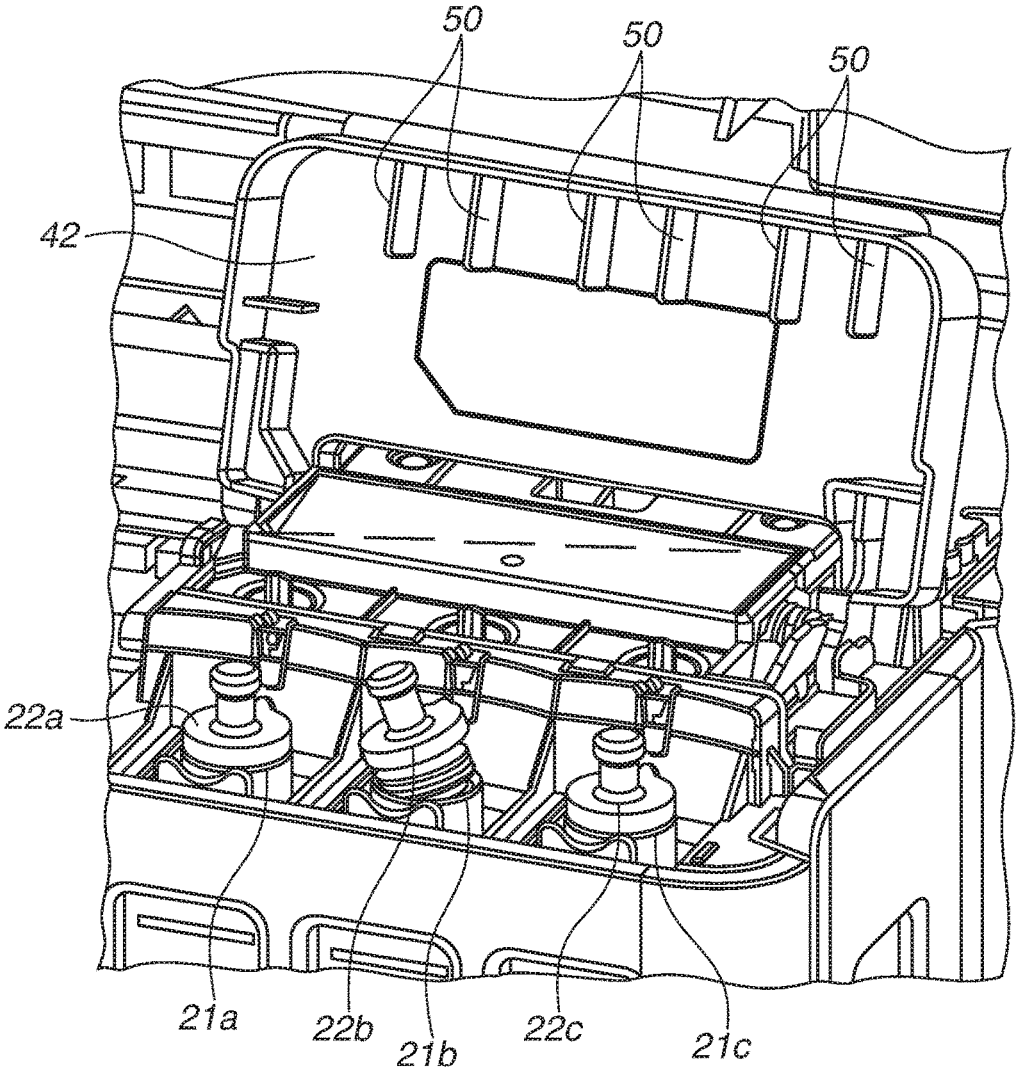
FIG. 10 is a perspective view illustrating a state of tank caps and a tank cover according to the first exemplary embodiment.
Figure 11A:
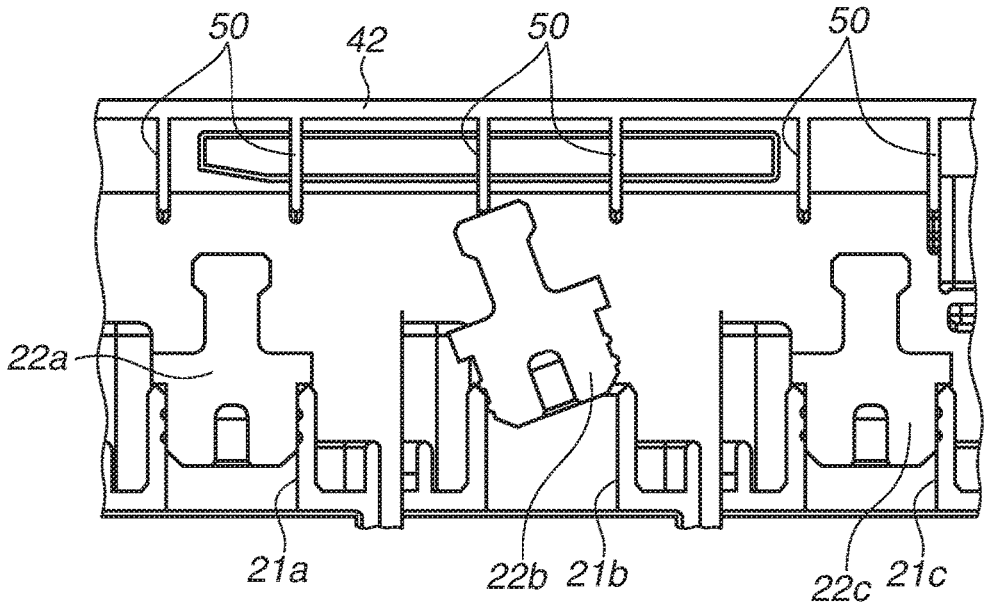
FIGS. 11A and 11B are schematic sectional views illustrating a state of the tank caps and the tank cover according to the first exemplary embodiment.
Figure 11B:
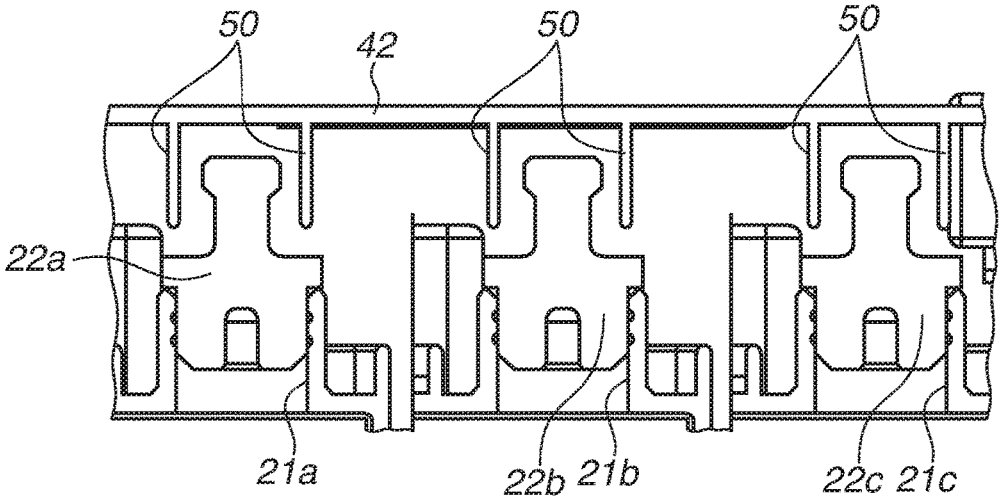

Further, a configuration in which the tank cap 22 is prevented from being erroneously mounted will be described with reference to FIG. 10 and FIGS. 11A and 11B. FIG. 10 is a perspective view illustrating a state of the tank cap 22 and the tank cover 42. FIGS. 11A and 11B are schematic sectional views respectively illustrating a state of the tank cap 22 and the tank cover 42.

In FIG. 10, a first tank cap 22a and a third tank cap 22c have been normally mounted on a first ink filling port 21a and a third ink filling port 21c, respectively. On the other hand, a second tank cap 22b has not been normally mounted on a second ink filling port 21b, and a gap has made between the second tank cap 22b and the second ink filling port 21b. In the present exemplary embodiment, even if an attempt to close the tank cover 42 is made in this state, the second tank cap 22b abuts on a rib 50 provided at the tank cover 42, as illustrated in FIG. 11A. Therefore, the user cannot normally close the tank cover 42. If the second tank cap 22b is not thus normally mounted, the tank cover 42 is prevented (restrained) from moving to a closed position. Thus, the user can recognize that the second tank cap 22b has not been normally mounted on the second ink filling port 21b. At this time, when the user opens the tank cover 42 again to normally mount the second tank cap 22b on the second ink filling port 21b again, the tank cover 42 can be normally closed without the rib 50 and the second tank cap 22b abutting on each other, as illustrated in FIG. 11B. In this way, in the present exemplary embodiment, a printing operation performed while the tank cap has not been normally mounted on the ink filling port (or does not properly seal a filling portion) can be prevented.

As described above, according to the present exemplary embodiment, it is possible to prevent the user from erroneously performing the opening and closing operation of the valve in the supply of ink from the ink tank to the recording head.

A second exemplary embodiment of the present invention will be described in detail below with reference to the drawings. Description of a similar configuration to that of the first exemplary embodiment is not repeated.

Figure 12A:
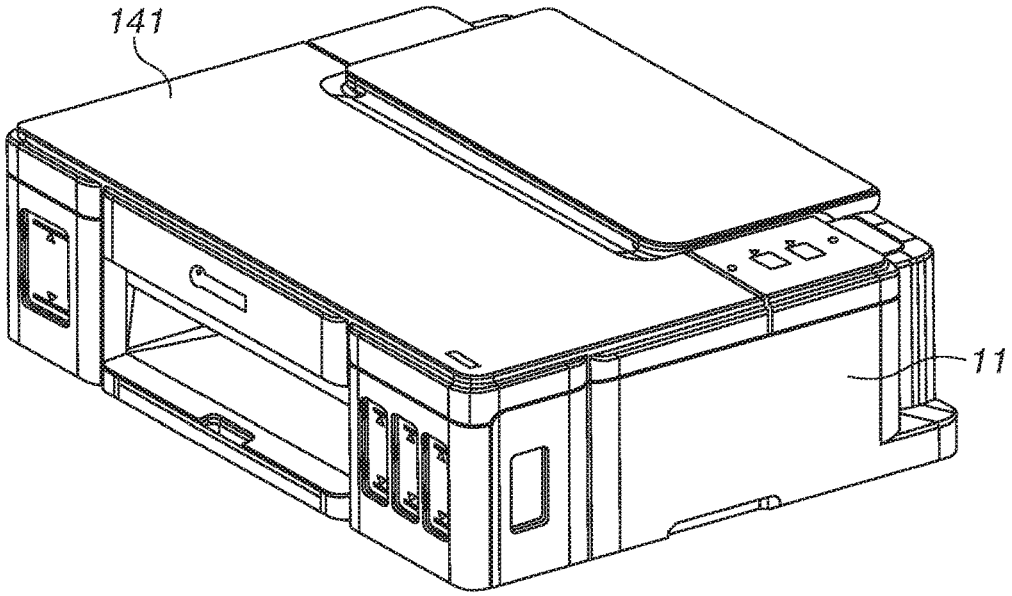
FIGS. 12A and 12B are perspective views of an ink jet recording apparatus according to a second exemplary embodiment.
Figure 12B:
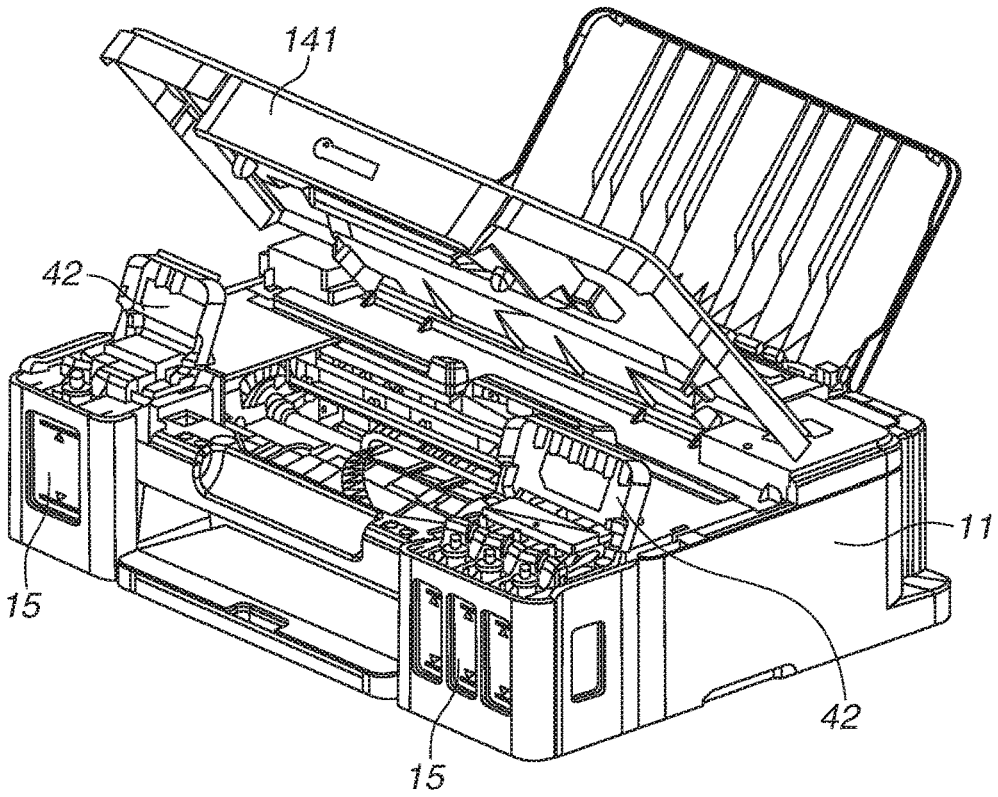

FIGS. 12A and 12B are perspective views of an ink jet recording apparatus 11 according to the present exemplary embodiment. In the present exemplary embodiment, the ink jet recording apparatus 11 includes an access cover (second cover member) 141. Access to a recording head 13 in the ink jet recording apparatus 11 is enabled by an opening and closing operation of the access cover 141. More specifically, the recording head 13 cannot be accessed with the access cover 141 closed, and can be accessed with the access cover 141 opened. FIG. 12A illustrates a state where the access cover 141 is closed. The ink jet recording apparatus 11 can perform a printing operation when the access cover 141 is closed. FIG. 12B illustrates a state where the access cover 141 is opened. When tank covers (first cover members) 42 are opened after the access cover 141 has been opened, ink can be filled into the ink tank 15.

In the present exemplary embodiment, the ink jet recording apparatus 11 includes a sensor (not illustrated) capable of detecting the opening and closing of the access cover 141. If it is detected that the access cover 141 remains closed, a printing operation can be performed. To close the access cover 141, the tank cover 42 needs to be closed. Accordingly, during the printing operation, the tank cover 42 is always closed, and a valve is opened. This can prevent a situation where no ink is supplied to the recording head 13 because the printing operation is performed with the valve unopened.

In the second exemplary embodiment, the ink jet recording apparatus 11 is configured to open and close the access cover 141 instead of the scanner unit 41 in the first exemplary embodiment. However, the present invention is not limited thereto. For example, a similar effect can be obtained even in a configuration in which an automatic document feeder (ADF) unit is opened and closed in an ink jet recording apparatus including the ADF unit, and another configuration in which an openable and closable cover member is provided.

Next, a third exemplary embodiment of the present invention will be specifically described below with reference to the drawings. Description of a similar configuration to those of the above-described exemplary embodiments is not repeated.

Figure 13A:
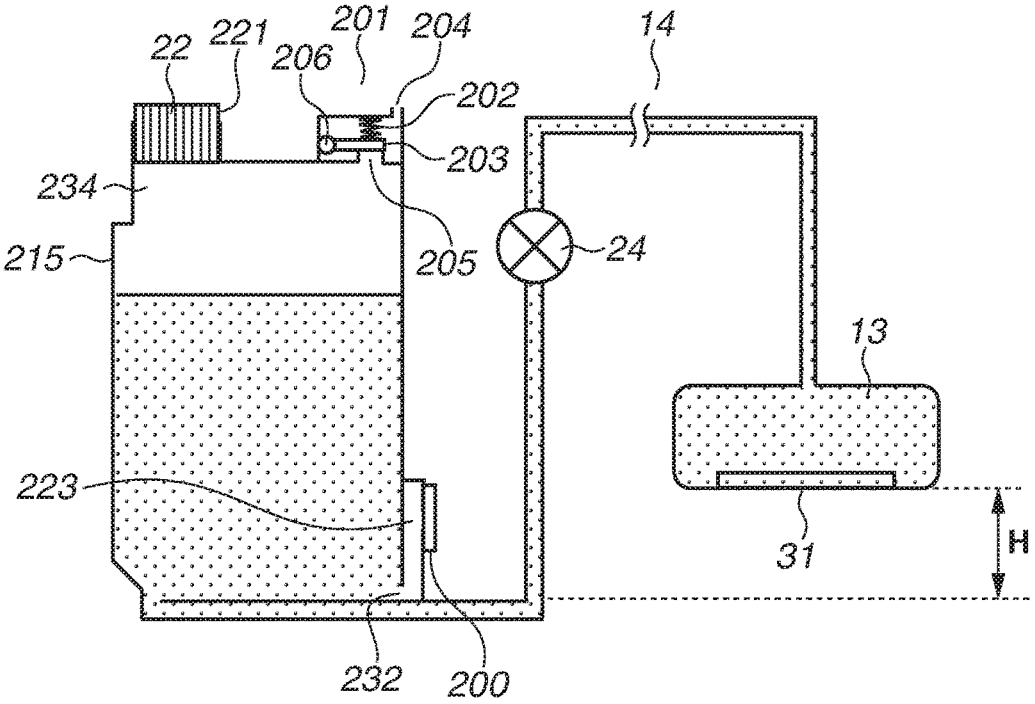
FIGS. 13A and 13B are schematic diagrams illustrating an ink supply system according to a third exemplary embodiment.
Figure 13B:
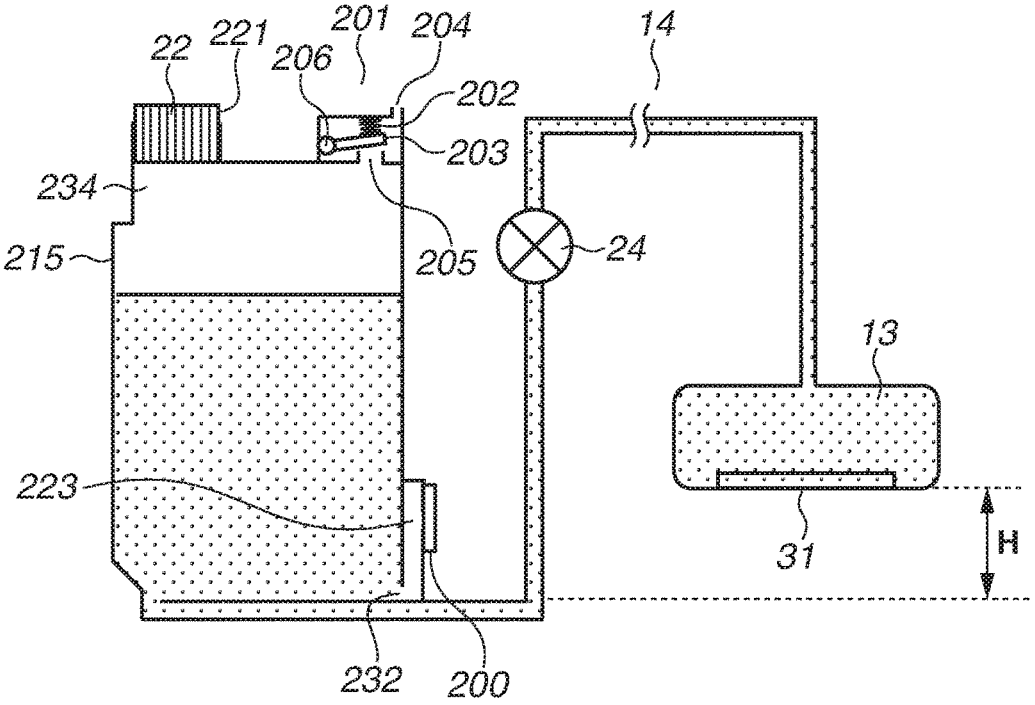

FIGS. 13A and 13B are schematic diagrams illustrating an ink supply system according to the present exemplary embodiment. An ink tank 215 is provided with an air communication port 223, and a gas-liquid separation film 200 is provided to cover the air communication port 223. The air-liquid separation film 200 transmits air serving as gas, and does not transmit ink serving as a liquid. More specifically, when ink is ejected by a printing operation, air whose amount corresponds to the amount of consumed ink flows into the ink tank 215 via a gas-liquid exchange portion 232 from the air communication port 223. The gas-liquid exchange portion 232 in the ink tank 15 is provided at a position lower by a height H in a height direction than an ink ejection port 31 in a recording head 13. Therefore, negative pressure caused by a water head difference corresponding to the height H is applied to the ink ejection port 31.

A pressure adjustment portion 201 is provided on the top of the ink tank 215. The pressure adjustment portion 201 is rotatably supported around a rotation center 206, and includes an opening/closing lever 203 capable of opening and closing an opening portion 205 and a pressure adjustment spring 202 for pressing the opening/closing lever 203 toward the opening portion 205. The pressure adjustment portion 201 is communicated with the external air via an air communication portion 204. FIG. 13A illustrates a state when there are a small atmospheric pressure variation and a small temperature change. In this state, the opening/closing lever 203 seals the opening portion 205. On the other hand, FIG. 13B illustrates a state where there have been an atmospheric pressure variation and a temperature change. If air in an ink storage portion 234 expands due to the atmospheric pressure variation and the temperature change, and pressure inside the ink tank 215 exceeds a predetermined value, the pressure adjustment spring 202 contracts, and the opening/closing lever 203 rotates upward. In this way, the sealing of the opening portion 205 is opened so that the pressure can be released out. According to the present exemplary embodiment, the ink tank 215 need not be provided with a buffer chamber so that more ink can be stored in the ink storage portion 234.

In the present exemplary embodiment, a valve unit 24, which is opened and closed interlocking with a tank cover (first cover member) 42, is provided only in an ink supply path 14 and is not provided in an air communication path 25. The air communication port 223 is provided with the gas-liquid separation film 200. Therefore, ink, which has been filled during ink filling, does not leak out via the air communication port 223. The air communication port 223 is provided at a position under the ink ejection port 31 in the recording head 13 in the height direction. Therefore, even if a liquid surface of ink has risen to the position of the air communication port 223 due to the atmospheric pressure variation and the temperature change, the recording head 13 is not pressurized. Further, a tube to be closed by the valve unit 24 is only a tube constituting the ink supply path 14. Therefore, a force required when a user operates the tank cover 42 can be reduced.

As described above, according to the present exemplary embodiment, a valve can be reliably closed when ink is filled, and the inside of the recording head can be kept at appropriate negative pressure during the printing operation.

Next, a fourth exemplary embodiment of the present invention will be described in detail below with reference to the drawings. Description of a similar configuration to that of the above-described exemplary embodiment is not repeated.

Figure 14:
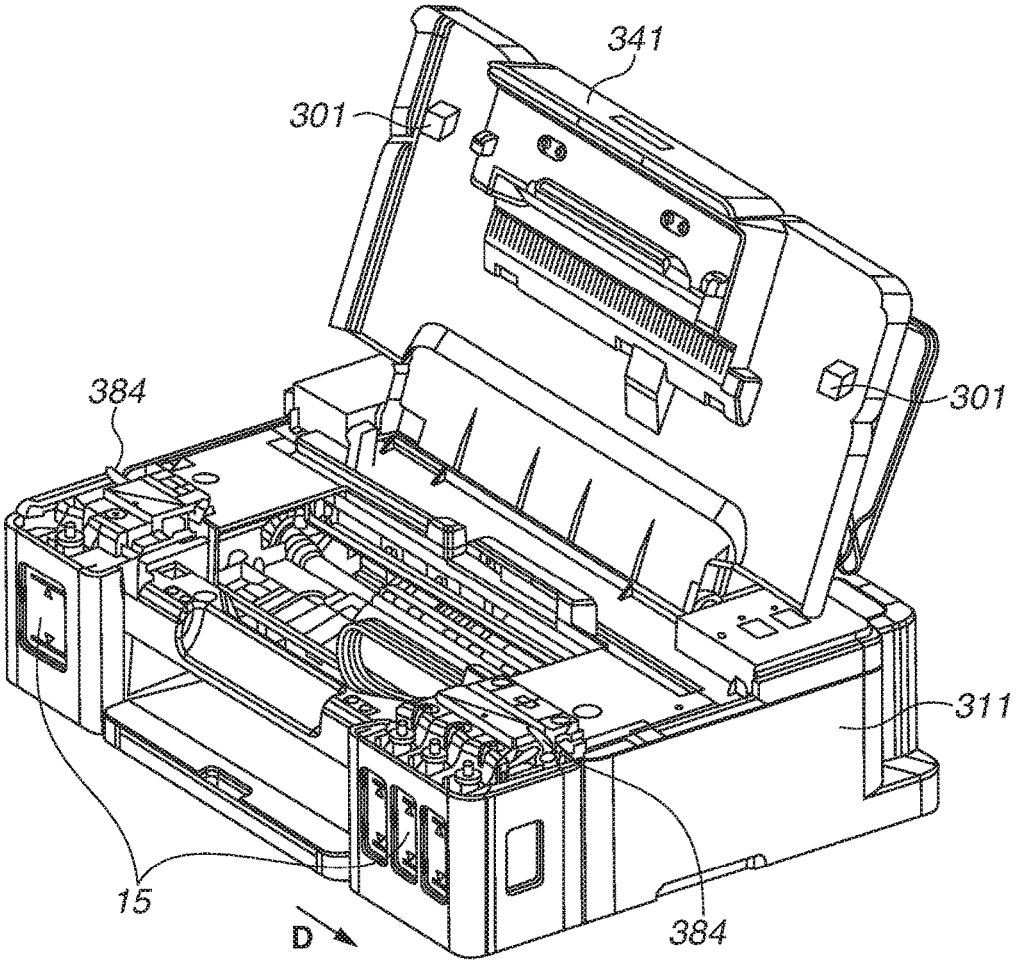
FIG. 14 is a schematic diagram illustrating an ink jet recording apparatus according to a fourth exemplary embodiment.

FIG. 14 is a schematic diagram illustrating an ink jet recording apparatus 311 according to the present exemplary embodiment. In the present exemplary embodiment, access to a recording head 13 in the ink jet recording apparatus 311 is enabled by opening an access cover (first cover member) 341. In the present exemplary embodiment, the access cover 341 is used as an operation portion in a valve unit 24 without the tank cover 42 being provided. More specifically, the valve unit 24 is opened and closed interlocking with an opening and closing operation of the access cover 341. The access cover 341 is provided with protrusions 301, respectively, at positions opposing a black-side valve unit arranged at the left and a color-side valve unit arranged at the right in FIG. 14.

Figure 15A:
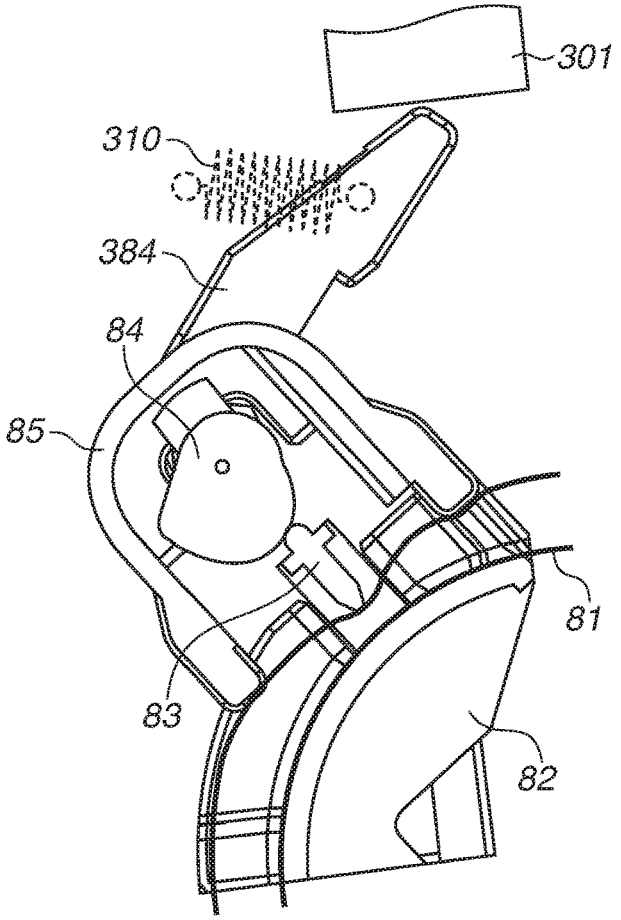
FIGS. 15A and 15B are schematic diagrams illustrating inside of a valve unit during a closing operation of the valve unit according to the fourth exemplary embodiment.
Figure 15B:
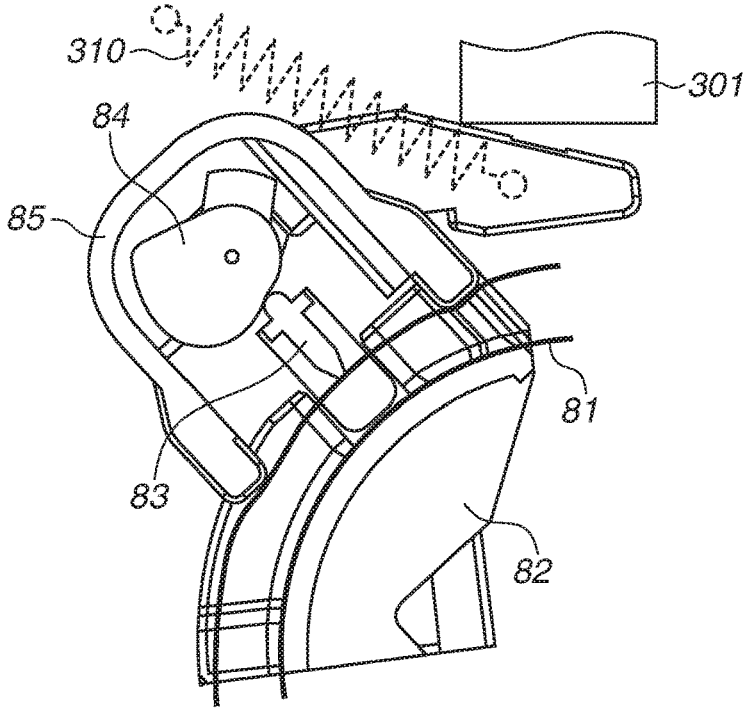

FIGS. 15A and 15B are schematic diagrams illustrating inside of a valve unit during a closing operation of the valve unit 24 and illustrating the color-side value unit as viewed from a D direction in FIG. 14. FIG. 15A illustrates a state where the valve is closed. An extension spring 310, which is attached to a lever portion 384 formed integrally with a cam member 84, has its one end fixed to an apparatus body. The tension spring 310 pulls the cam member 84 in the counterclockwise direction in FIG. 15A, and rotates the cam member 84 to a position where a tube 81 is closed. When the access cover 341 is closed, the protrusion 301 abuts on the lever portion 384, as illustrated in FIG. 15A. FIG. 15B illustrates a state where the access cover 341 is closed. The lever portion 384, which has been pressed by the protrusion 301, rotates in the clockwise direction in FIG. 15B, and stops at a position where the tube 81 is opened.

As described above, the valve is closed with the access cover 341 opened. Therefore, the valve can be reliably closed during ink filling. On the other hand, the tube 81 can be reliably opened with the access cover 341 closed.

In the present exemplary embodiment, the ink jet recording apparatus 311 includes a sensor (not illustrated) capable of detecting the opening and closing of the access cover 341, and can perform a printing operation when it is detected that the access cover 341 remains closed. This can prevent a situation where no ink is supplied to the recording head 13 because the printing operation is performed with the valve unopened.

More specifically, according to the present invention, an ink jet recording apparatus capable of restraining a user from erroneously performing an opening and closing operation of a valve in the supply of ink from an ink tank to a recording head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ink jet recording apparatus comprising:

a recording head configured to eject ink;

an ink tank including an injection portion for injecting ink to be supplied to the recording head;

a first cover member configured to be movable to a first position such that the injection portion is not exposed, and movable to a second position such that the injection portion is exposed;

an ink supply path configured to supply the ink from the ink tank to the recording head;

an air communication path for allowing communication of inside of the ink tank with external air; and a switching portion configured to be switchable between an open state to open the ink supply path and the air communication path in a case where the first cover member moves from the second position to the first position and a closed state to close the ink supply path and the air communication path in a case where the first cover member moves from the first position to the second position.

2. The ink jet recording apparatus according to claim 1, wherein the switching portion is switched from the closed state to the open state when the first cover member moves from the second position to the first position, and the switching portion is switched from the open state to the closed state when the first cover member moves from the first position to the second position.

3. The ink jet recording apparatus according to claim 1, further comprising a cap for sealing the injection portion, wherein the first cover member is prevented from moving from the second position to the first position by abutting on the cap in a case where the cap does not seal the injection portion.

4. The ink jet recording apparatus according to claim 1, wherein the ink supply path and the air communication path are formed of a tube, the switching portion has a cam member rotatable with respect to movement of the first cover member, and a displacement member configured to displace by frictionally sliding with the cam member so as to close the tube.

5. The ink jet recording apparatus according to claim 1, further comprising a second cover member pivotably supported on an apparatus body of the ink jet recording apparatus to be openable and closable, wherein the first cover member cannot be operated in a case where the second cover member is closed, and can be operated in a case where the second cover member is opened.

6. The ink jet recording apparatus according to claim 5, further comprising a detection means configured to detect opening and closing of the second cover member, wherein a recording operation can be performed in a case where the detection means detects that the second cover member is closed, and cannot be performed in a case where the detection means detects that the second cover member is opened.

7. The ink jet recording apparatus according to claim 5, wherein the first cover member prevents the second cover member from being closed when the first cover member is at the second position.

8. The ink jet recording apparatus according to claim 5, wherein the second cover member has a reading unit capable of reading an image on a document.

9. The ink jet recording apparatus according to claim 1, wherein the switching portion is switched interlocking with the movement of the first cover member.

10. The ink jet recording apparatus according to claim 1, wherein the ink tank is provided in an apparatus body of the ink jet recording apparatus.

11. An ink jet recording apparatus comprising:

a recording head configured to eject ink;

an ink tank including an injection portion for injecting ink to be supplied to the recording head via an ink supply path;

a first cover member configured to be movable to a first position such that the injection portion is not exposed, and movable to a second position such that the injection portion is exposed;

an air communication path for allowing communication of inside of the ink tank with external air; and a switching portion configured to be switchable between an open state to open the air communication path in a case where the first cover member moves from the second position to the first position and a closed state to close the air communication path in a case where the first cover member moves from the first position to the second position.

12. The ink jet recording apparatus according to claim 11, wherein the switching portion is switched from the closed state to the open state when the first cover member moves from the second position to the first position, and the switching portion is switched from the open state to the closed state when the first cover member moves from the first position to the second position.

13. The ink jet recording apparatus according to claim 12, wherein the switching portion is switched interlocking with the movement of the first cover member.

14. The ink jet recording apparatus according to claim 12, wherein the ink tank is provided in an apparatus body of the ink jet recording apparatus.

*15. An ink jet recording apparatus comprising:*

*a recording head configured to eject ink to record an image;*

*an ink tank provided in an apparatus body of the ink jet recording apparatus, including an ink storage portion for storing ink and a filling portion for supplying ink into the ink storage portion;*

*a first cover member configured to be movable to a first position where the filling portion is not exposed and a second position where the filling portion is exposed;*

*an air communication port configured to communicate the ink storage portion with air; and*

*a switching portion configured to switch between a state in which air enters the ink tank through the air communication port in a case where the first cover member is in the first position and ink in the ink storage portion is reduced, and a state in which air leaves the ink storage portion from a port which is different from the air communication port in a case where the first cover member is in the second position.*

*16. The ink jet recording apparatus according to claim 15, wherein the switching portion provides a state that air enters the ink tank in a case where the first cover member is in the first position.*

*17. The ink jet recording apparatus according to claim 15, wherein the switching portion prevents air leaving from the ink storage portion through the air communication port in a case where the first cover member is in the second position and ink is injected from the filling portion into the ink storage portion.*

*18. The ink jet recording apparatus according to claim 15, wherein the switching portion allows ink in the ink storage portion to flow into the recording head in a case where the first cover member is in the first position.*

*19. The ink jet recording apparatus according to claim 15, wherein the switching portion prevents ink in the ink storage portion from flowing into the recording head in a case where the first cover member is in the first position.*

*20. The ink jet recording apparatus according to claim 15, further comprising:*

*an air storage portion configured to store air and communicate with the ink storage portion.*

*wherein the switching portion, in a case where the first cover member is in the first position, prevents ink in the ink storage portion from entering the air storage portion by preventing air from entering or leaving the air communication port.*

*21. The ink jet recording apparatus according to claim 15, wherein the first cover member is pivotably supported on the apparatus body of the ink jet recording apparatus to be openable and closable.*

*22. The ink jet recording apparatus according to claim 15, further comprising:*

*an air storage portion configured to store air and communicate with the ink storage portion; and*

*an air communication path is provided so as to extend upward along the ink storage portion.*

*wherein the air storage portion communicates with the air communication port through the air communication path.*

*23. The ink jet recording apparatus according to claim 15, wherein*

*the first cover member includes a plurality of first cover members,*

*the switching portion includes a plurality of switching portions, and*

*opening and closing of one of the plurality of first cover members acts on a switching state of one of the plurality of switching portions.*

*24. The ink jet recording apparatus according to claim 15, further comprising:*

*a second cover member configured to be movable to a third position where the first cover member is not exposed and a fourth position where the first cover member is exposed,*

*wherein the first cover member is not operable in a case where the second cover member is closed, and is operable in a case where the second cover member is opened.*

*25. The ink jet recording apparatus according to claim 24, wherein the second cover member is pivotably supported on the apparatus body of the ink jet recording apparatus to be openable and closable.*

*26. The ink jet recording apparatus according to claim 24, further comprising:*

*a detection means configured to detect opening and closing of the second cover member,*

*wherein a recording operation is performable in a case where the detection means detects that the second cover member is closed, and is not performable in a case where the detection means detects that the second cover member is opened.*

*27. The ink jet recording apparatus according to claim 24, wherein the first cover member prevents the second cover member from being closed in a case where the first cover member is at the second position.*

*28. An ink jet recording apparatus comprising:*

*a recording head configured to eject ink to record an image;*

*an ink tank provided in an apparatus body of the ink jet recording apparatus, including an ink storage portion for storing ink and a filling portion for supplying ink to the ink storage portion;*

*a first cover member configured to be movable to a first position where the filling portion is not exposed and a second position where the filling portion is exposed;*

*an air communication port configured to communicate the ink storage portion with air; and*

*a switching portion configured to switch between a state that air enters the ink tank through the air communication port in a case where the first cover member is in the first position and ink in the ink storage portion is reduced, and a state that ink in the ink storage portion does not flow into the recording head in a case where the first cover member is in the second position.*

*29. The ink jet recording apparatus according to claim 28, wherein the switching portion provides a state in which air leaves the ink storage portion from a port which is different from the air communication port in a case where the first cover member is in the second position and ink is injected from the filling portion into the ink storage portion.*

*30. The ink jet recording apparatus according to claim 29, wherein the switching portion provides a state that air is prevented from entering into the ink storage portion or leaving from the ink storage portion through the air communication port in a case where the first cover member is in the second position.*

*31. The ink jet recording apparatus according to claim 28, wherein the switching portion, in a case where the first cover member is in the first position, allows ink in the ink storage portion to flow into the recording head.*

*32. The ink jet recording apparatus according to claim 31, wherein*

*the first cover member includes a plurality of first cover members,*

*the switching portion includes a plurality of switching portions, and*

*opening and closing of one of the first cover members acts on a switching state of one of the plurality of switching portions.*

*33. The ink jet recording apparatus according to claim 31, further comprising:*

*a second cover member configured to be movable to a third position where the first cover member is not exposed and a fourth position where the first cover member is exposed.*

*wherein the first cover member is not operable in a case where the second cover member is closed, and is operable in a case where the second cover member is opened.*

*34. The ink jet recording apparatus according to claim 33, wherein the second cover member is pivotably supported on the apparatus body of the ink jet recording apparatus to be openable and closable.*

*35. An ink jet recording apparatus comprising:*

*a recording head configured to eject ink to record an image;*

*an ink tank provided in an apparatus body of the ink jet recording apparatus, including an ink storage portion for storing ink and a filling portion for supplying ink to the ink storage portion;*

*a first cover member configured to be movable to a first position where the filling portion is not exposed and a second position where the filling portion is exposed;*

*an air communication port configured to communicate the ink storage portion with air; and*

*a portion configured to provide a state in which air enters or leaves the ink storage portion through the air communication port or a state in which air does not enter or does not leave the ink storage portion through the air communication port according to whether the first cover member is in the first position or in the second position.*

*36. The ink jet recording apparatus according to claim 35, wherein, according to whether the first cover member is in the first position or in the second position, the member provides a state in which air enters or leaves the ink storage portion through the air communication port and ink in the ink storage portion does not flow into the recording head, or a state in which air does not enter or does not leave the ink storage portion through the air communication port and ink in the ink storage portion flows into the recording head.*

*37. The ink jet recording apparatus according to claim 35, wherein*

*the first cover member includes a plurality of first cover members,*

*the ink jet recording apparatus includes a plurality of portions, and*

*opening and closing of one of the first cover members acts on a switching state of one of the plurality of portions.*

*38. The ink jet recording apparatus according to claim 35, further comprising:*

*a second cover member configured to be movable to a third position where the first cover member is not exposed and a fourth position where the first cover member is exposed,*

*wherein the first cover member is not operable in a case where the second cover member is closed, and is operable in a case where the second cover member is opened.*

*39. The ink jet recording apparatus according to claim 38, wherein the second cover member is pivotably supported on the apparatus body of the ink jet recording apparatus to be openable and closable.*

*40. The ink jet recording apparatus according to claim 39, wherein the switching portion provides a state in which air leaves the ink storage portion from a port which is different from the air communication port in a case where the first cover member is in the second position and ink is injected from the filling portion into the ink storage portion.*

*41. An ink tank provided to an ink jet recording apparatus having a first cover member comprising:*

*a filling portion configured to inject ink to be supplied to a recording head;*

*an ink storage portion configured to store ink injected from the filling portion; and*

*an air communication port configured to communicate the ink storage portion with air,*

*wherein the ink tank is in a state in which air enters the ink tank through the air communication port in a case where the filling portion is covered by the first cover member and ink in the ink storage portion is reduced, and*

*the ink tank is in a state in which air leaves the ink storage portion from a port which is different from the air communication port in a case where the filling portion is not covered by the first cover member.*

*42. The ink tank according to claim 41, wherein the ink tank is in a state that air enters the ink storage portion in a case where the filling portion is covered by the first cover member and ink in the ink tank is reduced.*

*43. The ink tank according to claim 41, wherein, in a case where the filling portion is not covered by the first cover member and ink is injected from the filling portion into the ink storage portion, the ink tank is in a state that air does not enter or leave the ink storage portion through the air communication port.*

*44. The ink tank according to claim 41,*

*wherein the ink tank is in a state that ink in the ink storage portion is allowed to flow into the recording head in a case where the filling portion is covered by the first cover member, and*

*the ink tank is in a state that ink in the ink storage portion is not allowed to flow into the recording head in a case where the filling portion is not covered by the first cover member.*

*45. An ink tank provided to an ink jet recording apparatus having a first cover member comprising:*

*a filling portion configured to inject ink to be supplied to a recording head;*

*an ink storage portion configured to store ink injected from the filling portion; and*

*an air communication port configured to communicate the ink storage portion with air,*

*wherein the ink tank is in a state that air enters the ink tank through the air communication port in a case where the filling portion is covered by the first cover member and ink in the ink storage portion is reduced, and*

*the ink tank is in a state that ink in the ink storage portion does not flow into the recording head in a case where the filling portion is not covered by the first cover member.*

*46. The ink jet recording apparatus according to claim 45, wherein the ink tank is in a state in which air leaves the ink storage portion from a port which is different from the air communication port in a case where the filling portion is not covered by the first cover member and ink is injected from the filling portion into the ink storage portion.*

*47. The ink jet recording apparatus according to claim 45, wherein the ink tank is in a state that air is prevented from entering into the ink storage portion or leaving from the ink storage portion through the air communication port in a case where the filling portion is not covered by the first cover member and ink is injected from the filling portion into the ink storage portion.*

*48. The ink jet recording apparatus according to claim 45, wherein the ink tank is in a state that ink in the ink storage portion is allowed to flow into the recording head in a case where the filling portion is covered by the first cover member, and*

*the ink tank is in a state that ink in the ink storage portion is not allowed to flow into the recording head in a case where the filling portion is not covered by the first cover member.*

* * * * *